(12) United States Patent
Perkins et al.

(10) Patent No.: US 11,471,003 B1
(45) Date of Patent: Oct. 18, 2022

(54) COMBINATION CUTTING BOARD AND SEALABLE CONTAINER

(71) Applicant: Matthew Wade Perkins, Turlock, CA (US)

(72) Inventors: Matthew Wade Perkins, Turlock, CA (US); Sally Ng, Morro Bay, CA (US); Joe McArdle, Cupertino, CA (US)

(73) Assignee: Matthew Wade Perkins, Turlock, CA (US)

( * ) Notice: Subject to any disclaimer, the term of this patent is extended or adjusted under 35 U.S.C. 154(b) by 0 days.

(21) Appl. No.: 17/566,236

(22) Filed: Dec. 30, 2021

(51) Int. Cl.
| *A47J 47/00* | (2006.01) |
| *B65D 45/20* | (2006.01) |
| *B65D 43/02* | (2006.01) |
| *A47J 47/14* | (2006.01) |

(52) U.S. Cl.
CPC ........... *A47J 47/005* (2013.01); *A47J 47/14* (2013.01); *B65D 43/0212* (2013.01); *B65D 45/20* (2013.01)

(58) Field of Classification Search
CPC .... B65D 43/00; B65D 43/02; B65D 43/0204; B65D 43/0212; B65D 45/20; B65D 45/16; B65D 45/02; A47J 47/14; A47J 47/005; A47J 47/02
See application file for complete search history.

(56) References Cited

U.S. PATENT DOCUMENTS

| 2,609,024 | A | | 9/1952 | Russ |
| 3,902,540 | A | * | 9/1975 | Commisso ............... A47J 47/02 |
| | | | | 220/4.24 |
| 4,840,361 | A | | 6/1989 | Richter |
| D408,733 | S | | 4/1999 | McCann |
| 6,142,332 | A | | 11/2000 | Ferrara |
| 6,422,551 | B1 | | 7/2002 | Brotz |

(Continued)

FOREIGN PATENT DOCUMENTS

| DE | 202011102233 A1 | 10/2011 |
| DE | 102011106639 A1 | 1/2013 |

(Continued)

OTHER PUBLICATIONS

LocknLock "LocknLock Easy Essentials Food Storage lids/Airtight containers, BPA Free, Butter—25 oz, Clear"; Amazon.com, 2022; Date available: Nov. 15, 2010; https://www.amazon.com/LocknLock-Essentials-Airtight-containers-Butter-25/dp/B0018ABHGW/ref=sr_1_1?crid=27LAY5D4ZGRSU&keywords=b0018abhgw&qid=1647441364&s.*

(Continued)

*Primary Examiner* — Javier A Pagan
(74) *Attorney, Agent, or Firm* — Sierra IP Law, P.C.; Mark D. Miller

(57) ABSTRACT

The present invention provides stackable food storage containers having a cutting board base with a peripheral channel that may receive fluids from food prepared on the cutting board and that may also receive the peripheral edge of a lid. The lid may include a peripheral gasket for sealing engagement with the base, and may be fastened to the cutting board base with a series of clamps provided on each side. The lid may be operable to cover prepared food on the base without disturbing it for storage and/or transport, and may also provide a water-tight seal along the perimeter of the cutting board and lid. Multiple cutting boards and sealable lids of different sizes may be placed in staggered nestable stacks.

18 Claims, 15 Drawing Sheets

(56) References Cited

U.S. PATENT DOCUMENTS

| | | |
|---|---|---|
| 6,793,096 B1 | 11/2004 | Seok |
| 6,886,694 B2 | 5/2005 | McNeeley et al. |
| 7,090,089 B2 | 8/2006 | Lown et al. |
| 7,134,653 B1 | 11/2006 | Ladenheim |
| 7,533,875 B2 | 5/2009 | Willen et al. |
| 8,720,879 B1 | 5/2014 | Schrimper |
| 8,733,550 B2 | 5/2014 | Harvey et al. |
| D735,524 S | 8/2015 | Holding et al. |
| D745,312 S | 12/2015 | Lovgren |
| 9,687,113 B2 | 6/2017 | Torlai et al. |
| D814,234 S | 4/2018 | Joseph |
| 10,105,014 B2 | 10/2018 | Bagley |
| 10,375,971 B1 | 8/2019 | Tyminski |
| 2005/0000963 A1 | 1/2005 | Cautereels et al. |
| 2005/0205572 A1 | 11/2005 | Leibowitz |
| 2008/0041985 A1 | 2/2008 | Lai |
| 2008/0296823 A1 | 12/2008 | Pourounidis et al. |
| 2009/0223853 A1 | 11/2009 | Kim |
| 2014/0091508 A1 | 4/2014 | Chalifoux |
| 2014/0225320 A1 | 8/2014 | Gotsis |
| 2015/0097566 A1 | 4/2015 | Grodzki |
| 2016/0045076 A1 | 2/2016 | de Groote |
| 2017/0150744 A1 | 6/2017 | Wangler |
| 2018/0093804 A1 | 4/2018 | Takhalova |
| 2018/0155108 A1* | 6/2018 | Jenkins .............. B65D 43/0202 |

FOREIGN PATENT DOCUMENTS

| | | |
|---|---|---|
| DE | 102011115470 A1 | 4/2013 |
| KR | 20160020366 A | 2/2016 |
| WO | 02/28249 A1 | 11/2002 |
| WO | 2014/129868 A1 | 8/2014 |
| WO | 2015/068941 A1 | 5/2015 |

OTHER PUBLICATIONS

LocknLock ©, "LocknLock food container Catalog 2021," 2021, <https://us.locknlock.com/kor/image/common/file/catalog/210618_e_catalog_container_pc.pdf>.

LocknLock, "LocknLock Easy Essential Food Storage lids Airtight containers BPA Free Butter 25 oz. Clear," Amazon.com, 2021, <https://www.amazon.com/LocknLock-Essentials-Airtight-containers-Butter-25/dp/B0018ABHGW/ref=sr_1_1?th=1>.

Oxo, "Good Grips Butter Dish," Amazon.com, 2021, <https://www.amazon.com/OXO-11122500-Grips-Butter-White/dp/B00L9X6M6l/ref=sr_1_17>.

Lutz, "DE202011102233_Translation_Abstract," Espacenet.com, accessed 2021.

Gleich, "DE102011106639_Translation_Abstract," Espacenet.com, accessed 2021.

Gleich, "DE102011115470_Translation_Abstract," Espacenet.com, accessed 2021.

Grotjean-Hendrik DE, "KR20160020366_Translation_Abstract," Espacenet.com, accessed 2021.

* cited by examiner

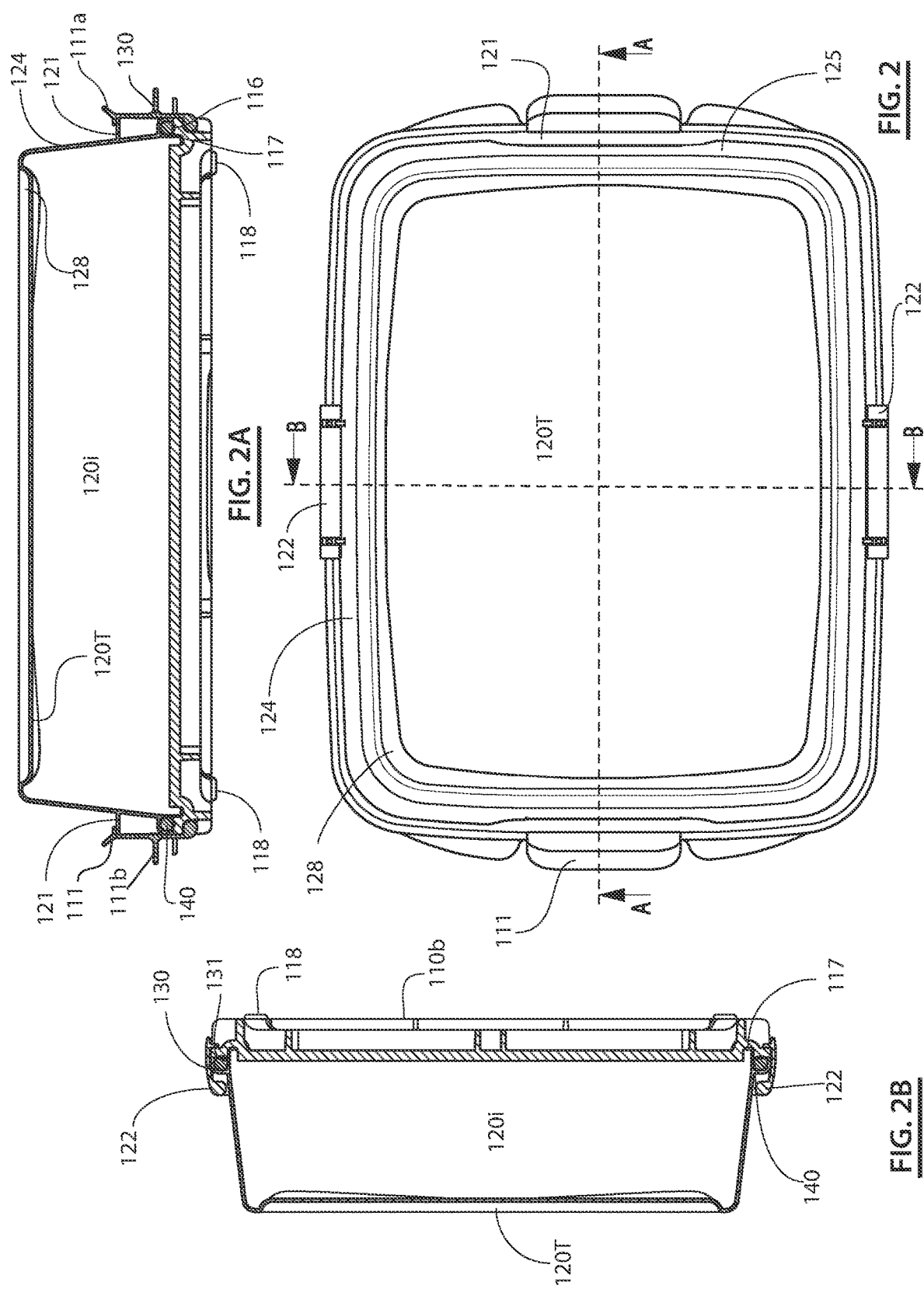

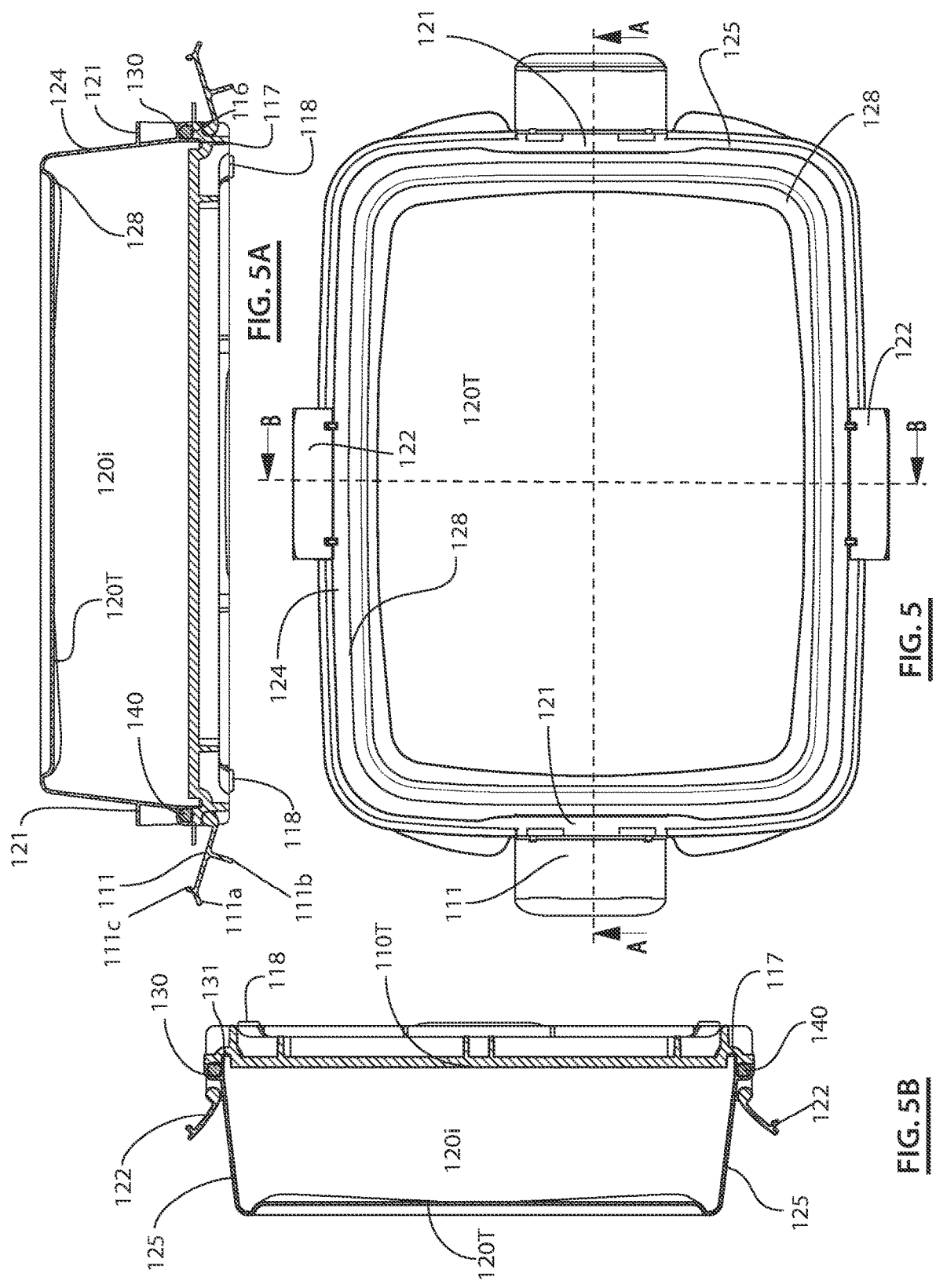

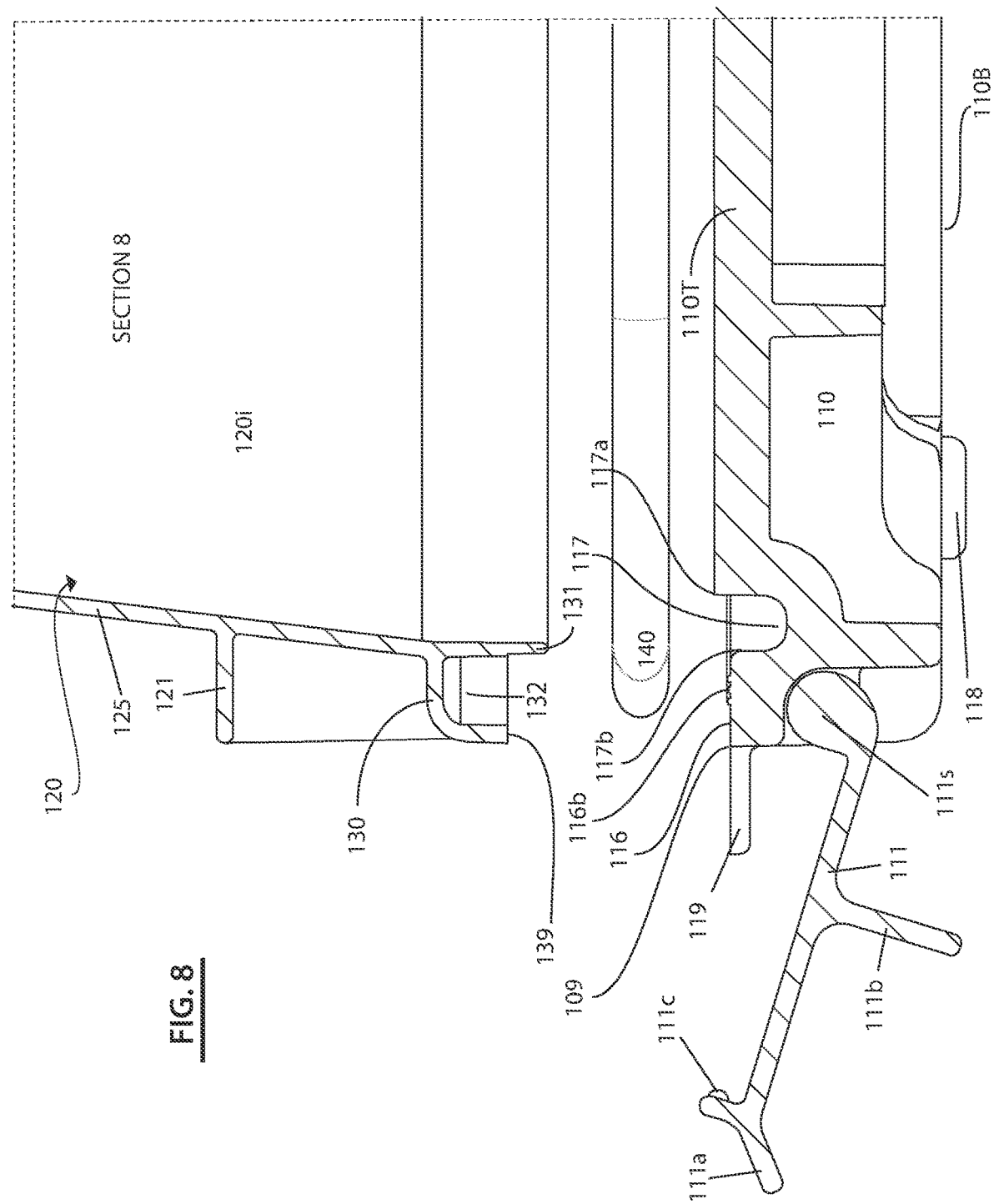

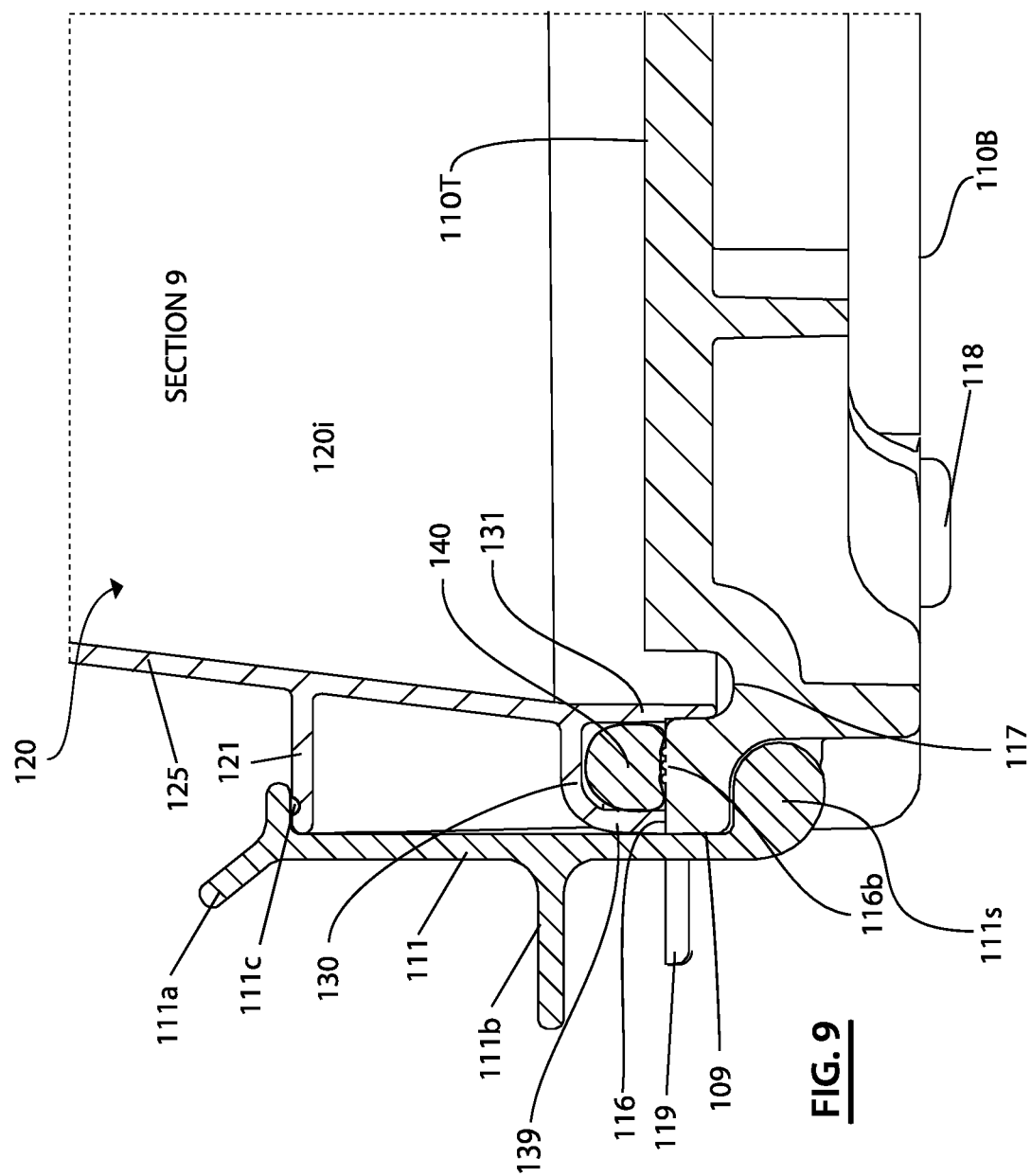

COMBINATION CUTTING BOARD AND SEALABLE CONTAINER

FIELD OF THE INVENTION

The present invention relates generally to food storage containers, cutting and chopping boards, and methods of use. More particularly, embodiments of the present invention are directed toward stackable food storage containers having a cutting board base and a sealable lid system.

BACKGROUND OF THE INVENTION

Cutting boards and food storage containers are utilized in many households are often required to prepare and store food. Food storage containers are often used to store prepared food or leftover foods. Many existing food storage containers include a bowl or basin having a volume for receiving food, and a flat planar lid with one or more peripheral hinges for locking the lid to the upper edge of the basin to enclose food inside. Cutting or chopping boards are flat surfaces that provide a surface for preparing meat, nuts or other food items. These must be durable to withstand the cutting action of a knife blade. In some cutting boards, drippings may be collected in a channel along the periphery of the board. The chopped meat is often then transferred to separate a food storage container and for storage.

In general, food storage containers do not provide a suitable food preparation surface or solution. However, the lids of some containers include a cutting surface on the interior of the lid. While such lids may allow for some food preparation, they are often flimsy and do not provide rigidity and functionality of a conventional cutting board. Moreover, any presentation qualities of the prepared food is lost when the food is dumped into the container. As a result, separate cutting boards, presentation platers, and food storage containers are often utilized for the separate functions of chopping/cutting, storing, and presenting prepared food. There is an ongoing need for a cutting board and sealable lid container system that reduces or eliminates the number of kitchen items needed for the functions of chopping, presenting, and storing food, allowing the same unit to be used to process, store, and present food for eating. When presentation is not relevant (e.g., for a salad), there is also a need for an invertible cutting board and lid configured as a container, that allows food to be processed on the cutting board, covered with a lid, and inverted for use as a bowl—and then sealed for storage or transportation, to protect from outside contamination.

SUMMARY OF THE INVENTION

The present invention provides a combination of food storage container and cutting board with sealable lid, and methods of use. Embodiments of the combination units of the present invention may include a sturdy base having a flat surface centrally located thereon for use as a cutting board, and a lid that may be fastened to the edges of the base using a plurality of clips provided on the sides. The lid may be operable to cover prepared food and may also provide a water-tight seal along the perimeter of the base where it meets the lid. The water-tight seal may utilize a gasket. The lid may have a recessed top surface that is operable to receive the underside of a base of another combination unit, allowing multiple units of the same size to be stacked for easy storage and/or transport. Multiple bases and sealable lids of different sizes may be placed in a staggered nestable stack.

Embodiments of the base may include a top surface having a central cutting area (cutting board) with a recessed channel provided along the cutting board's periphery. An additional peripheral bearing surface may extend outward from the periphery of the recessed channel to the exterior perimeter of the base. The cutting board surface may be raised above the bearing surface to allow runoff from cutting produce or meat to collect in the recessed channel. The raised cutting board surface also allows for the act of cutting to be unimpeded by adjacent structures. The bearing surface may have a plurality of upwardly extending ridges thereon. These ridges may be located between the recessed channel and a midway point of the bearing surface. The base may have a rectangular geometry with filleted corners and should be symmetrical along a longitudinal plane and lateral plane about the centroid of the base. It is to be appreciated that the base may be provided in other symmetrical forms such as, without limitation, a square or a circle, although forms having a longer longitudinal axis, such as an oval or a diamond or other similar structure, are generally more suitable.

In embodiments of the invention, four clamps are provided: on the front, on the back, and on both sides of the container. The clamps located on the front and the back of the container may be in the form of snap-locks or side locks, where the snap-lock receivers are located on the base and engage with corresponding snap locks that are pivotally (e.g. hingedly) attached to the lid. The clamps located on the lateral sides of the container (e.g., right and left sides) may be in the form snap-locks or slide locks where the snap-lock receivers are on the lid and engage with corresponding snap locks that are pivotally (e.g., hingedly) attached to the base. These clamps may be positioned strategically (e.g., centrally) on each of the four sides of the container. It has been determined that better engagement and sealing is accomplished where clamps having the same orientation are located on opposite sides from each other, and where opposing pairs of clamps have a different orientation. Thus, a better engagement and seal may be accomplished, for example, where the pivotal hinge members of the two oppositely positioned clamps on the front and back of the container are both attached to the base (with both receivers on the lid), and the pivotal hinge members of the two oppositely positioned clamps on the two sides of the container are both attached to the lid (with both receivers on the base). Similarly, a better engagement and seal may be accomplished, in another example, where the pivotal hinge members of the two oppositely positioned clamps on the front and back of the container are both attached to the lid (with both receivers on the base), and the pivotal hinge members of the two oppositely positioned clamps on the two sides of the container are both attached to the base (with both receivers on the lid).

It is to be appreciated that although the clamps connecting the base to the lid are illustrated as hinged snap-lock devices, other suitable clamping devices may also be provided which firmly engage the lid part to the base part, including without limitation rotatable or swivel pieces on one part that engage a recess on the other part, slidable locks which engage corresponding structures on each part, hinged tabs and receiving slots, The base may further have a bottom surface with a plurality of tactile feet positioned at the corners and the center of the base to provide friction when the base is placed on a countertop, table, or other suitable surfaces for food preparation. The underside of the base may also be shaped so as to conform to a recess in a lid of another container for stacking. In alternative embodiments, the underside or sides of the base may include one or more recessed areas or slots designed to receive a kitchen utensil such as without limitation a knife, fork, spoon or spork. Each such recess or slot may be provided in a side or on the bottom of the base. In these embodiments, a magnet, clip, slide or other structure may be provided in or adjacent to the recess to hold the kitchen utensil in place when not in use. In other embodiments, the lid may be provided with an integrated handle.

In other embodiments, one or more removable partitions may be provided which may be placed on said cutting board after food has been processed to separate different food items from each other. Such partitions may take any of a number of forms including without limitation simple separating walls, a set of walls in an X-shape, a set of walls in a tic-tac-toe (#) configuration, or other arrangements suitable for the food items to be separated. In these embodiments, the walls may extend upward, and the lid may be provided with indentations, dimples or divots to receive the upper edges of the upwardly extending walls to hold them in place against the cutting board surface while the container is transported or stored.

Embodiments of the base comprising the cutting board, recessed channel, and bearing surface may be manufactured from wood or a variety of plastics. The plastics may be colors that can be selected to have a particular color combination for purely aesthetic reasons or to comport with the FDA HACCP (Hazard Analysis and Critical Control Point) food safety color-coding system. The tactile feet may be manufactured from a rubber flexible plastic or rubber to provide friction to the system. In some embodiments, the cutting board surface may be a different material than the remainder of the base. For example, the cutting board may be manufactured from wood, and the remainder of the base may be manufactured from plastics. The clamps may be manufactured from a plastic material and may snap into a base's hinge. In some embodiments, the clamps may be in the form of a living hinge that is molded into the base when manufactured.

Embodiments of the lid may include a shell comprising a top surface, sidewalls, and a bottom edge having a lip. The space between the sidewalls and the top surface provides an interior cavity that may cover the contents of the container without touching them. In some embodiments, the exterior edge of the lip may align with the exterior perimeter of the base, such that the lid and base are flush when in a locked position. In some embodiments, the exterior edge of the lip may be provided with an assembly that extends down from the bottom edge of the lip into a peripheral channel in the base. This assembly may include one or more flanges defining a gap for receiving a peripheral gasket. In some embodiments, the lid may also be symmetrical along a longitudinal plane and a lateral plane about the center of the lid. In some embodiments, the longitudinal ends of the lid (e.g., front and back sides of the lid) may have one or more clamps that may be in the form of snap-lock hinges that are complementary to base snap-lock receivers. In some embodiments, the lateral sidewalls of the lid (e.g., left and right sides of the lid) may have one or more clamps that may be in the form of a snap-lock receivers that are complementary to base snap-lock hinges. In some embodiments, the lid may have a recessed top surface that is operable to receive the underside of a base of a separate cutting board and sealable container. In some embodiments, the lid snap-lock receiver may be on a ridge that is substantially perpendicular to the lateral ends of the lid and parallel to the base. The top surface of the lid and the bottom edge of the lid may be offset such that the sidewalls taper upward from the bottom edge to the perimeter edge of the top surface.

In some embodiments, the lid top surface, recess, sidewalls, flange, and lip may be manufactured as a single piece, constructed from a plastic material, by injection molding, additive manufacturing, or machining. The plastic may be transparent or colored for aesthetic reasons or to comport with the FDA HACCP food safety color-coding system. In some embodiments, the walls, top edge, and bottom lip may be manufactured from plastic, and the recessed top surface may be manufactured from glass. In yet other embodiments, the top surface, recess, sidewalls, flange, and lip may be manufactured from glass. In some embodiments, the gasket may be manufactured from a pressure-sensitive plastic material that is operable to deform and may be removably secured for easy disinfecting or permanently attached with an adhesive in the space provided by the gap. Like the base, the clamps may be manufactured from a plastic material and may be snapped into a hinge receiver of the lid. In some embodiments, the hinges may be a living hinge that is molded into the lid when manufactured.

The combination cutting board base and sealable lid may be provided in unlocked or locked configurations. When the lid is not in use, the base may be placed, for example, on a countertop, and a user may prepare food (e.g., meat, vegetables, cheese, etc.) by chopping, slicing, or cutting. Once the contents are prepared, a user may align the edge of the lid with the recessed channel of the base. The user may then close the clamps by, for example, engaging the lateral snap-locks of the base with the snap-lock receivers of the lid. Similarly, the longitudinal snap-locks of the lid may be engaged with the base snap-lock receivers. The opposing forces created by these oppositely oriented clamps causes the gasket to be firmly pressed against the ridges of the bearing surface, thus providing a water-tight seal along the periphery of the recessed channel, thereby placing the system in a sealed and locked configuration. The recessed top surface of the lid provides a space to stack a separate combination cutting board and sealable container system. In different embodiments, the separate combination cutting boards and sealable container systems may be scaled to a smaller size but maintain the components included in a full-size combination cutting board and sealable lid system. Such embodiments may be nested together for storage.

The following exemplary dimensions related to an embodiment of a cutting board and sealable lid system are by way of example only, and without limitation, and are given to provide an understanding of a set of basic geometric proportions that may be used, and are not intended to provide precision or exact proportions, or to limit the size, shape or dimensions of any embodiment of the invention. In such an exemplary embodiment, a full-sized base may have a lateral width of about eleven (11) inches and a longitudinal length of about fourteen (14) inches. The exemplary bearing surface may extend out about one half (½) inch beyond the periphery of the exterior perimeter of the base. The exemplary fluid channel may be about one quarter (¼) of an inch wide, located between the bearing surface and the cutting board perimeter. The exemplary cutting surface may have a lateral length of about nine and three quarter (9¾) inches, and the longitudinal length of about thirteen (13) inches. The exemplary lid may have dimensions complementary to the fluid channel in the base. The exemplary peripheral bottom lip may have a longitudinal length of about thirteen (13)

inches and a lateral length of about ten (10) inches. The gap extending out from the bottom edge of the lid may have a length of about one quarter (¼) inch, and the flange may have a length of about one-sixteenth (1/16) of an inch. The top edge of the lid may be offset bottom by a distance of about one-half (½) inch to provide tapering. The recessed top surface may have an offset distance of one-quarter (¼) inch from the top edge. The dimensions of smaller cutting boards may be scaled to a percentage of a full-size combination cutting board and sealable container system.

The present invention provides a combination cutting board and sealable container system that is operable to provide a cutting surface and a container that is stackable, stowable and/or transportable. It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

One aspect of the invention includes a sealable container comprising a generally rectangular base having a raised upper cutting surface, a peripheral edge, two generally parallel longitudinal sides, two generally parallel lateral sides perpendicular to said longitudinal sides, a peripheral channel around said raised upper surface, and a lower bearing surface extending out from said channel to said peripheral edge; a generally rectangular lid comprising an interior cavity and peripheral edge having an internal peripheral flange thereon that is complementary to said peripheral channel such that said flange is operable to be inserted into said channel, and a curved outer peripheral lip defining a gap between said flange and said lip; a deformable gasket provided in said gap for providing a seal between said gasket and said bearing surface when said lip is engaged with said base; a first pair of clamps oppositely positioned from each other on each of said longitudinal sides of said container; and a second pair of clamps oppositely positioned from each other on each of said lateral sides of said container; wherein each of said first pair of clamps includes a hinge member that is pivotally attached to one of either said lid or said base, and wherein each of said second pair of clamps includes a hinge member that is pivotally attached to the opposite one of either said lid or said base.

In some embodiments, each of the first pair of clamps may include a hinge member that is pivotally attached to the lid and a corresponding receiver attached to the base, and each of the second pair of clamps may include a hinge member that is pivotally attached to the base, and a corresponding receiver attached to the lid. In these embodiments, each of the hinge members of the second pair of clamps may further comprise a first tab that extends outward when the hinge is engaged with the corresponding receiver, and may include a second tab on a corner of the hinge that extends at an upward angle when the hinge is engaged with the receiver.

In other embodiments, each of the first pair of clamps may include a hinge member that is pivotally attached to the base and a corresponding receiver attached to the lid, and each of the second pair of clamps may include a hinge member that is pivotally attached to the lid, and a corresponding receiver attached to the base. In these embodiments, each of the hinge members of said first pair of clamps may further comprise a first tab that extends outward when the hinge is engaged with the corresponding receiver, and may include a second tab on a corner of the hinge that extends at an upward angle when the hinge is engaged with the receiver.

In some embodiments, the container may include a plurality of ridges on the bearing surface where the bearing surface meets the gasket when the lid is engaged with the base. In some embodiments, the lid may further comprise two generally parallel longitudinal sides, two generally parallel lateral sides perpendicular to the longitudinal sides, and an upper surface that includes a recess operable to receive a bottom surface of said base, or to receive a bottom surface of a base of another of sealable container.

In another aspect, the present invention provides a combination cutting board and sealable container system, the system comprising: a base having a cutting board on a top surface thereof, a bottom surface having a plurality of tactile feet, two lateral sides, each such side having a one or more clamps that may be in the form of a hinged snap-lock and two longitudinal sides each having one or more clamps that may be in the form of a snap-lock receiver, an outer bearing surface adjacent to a perimeter of the base and a recessed channel provided between a peripheral edge of the top surface and the outer bearing surface, a container lid comprising a top surface, an interior cavity, an exterior surface two lateral sides each having one or more clamps that may be in the form of a snap-lock receiver thereon, a first longitudinal side having one or more clamps that may be in the form of a hinged snap-lock thereon, and a peripheral bottom lip having a peripheral gasket corresponding to the outer bearing surface, and wherein the top surface of the container lid includes a recess operable to receive a bottom surface of the base, or to receive a bottom surface of a base of a separate combination cutting board and sealable container system. The bearing surface of the base may be operable to receive the peripheral lip of the container lid. The lateral snap-lock may be operable to engage with the container snap-lock receiver on said lateral surface. The container lid snap-lock may be operable to engage with the side lock receiver on the longitudinal surface, thereby compressing the gasket against the bearing surface to form a water-tight seal along the periphery of the base.

It is a further aspect of the combination cutting board and sealable container system to provide a lid further include a flange offset from the peripheral bottom lip such that the flange protrudes out from the lids exterior surface and extends into the recessed channel against a junction of the bearing surface and the recessed channel. The flange and peripheral bottom lip may be operable to secure the peripheral gasket therebetween. The flange may be operable to align the lid with the base such that lateral and longitudinal movement of the lid is prohibited while the snap-locks are secure to their respective lock receivers. The perimeter of the base may be substantially rectangular, and the peripheral lip of the lid may be complementary to the base perimeter. The plurality of tactile feet may be at least four positioned at the corners of the base bottom surface and may be operable to provide friction when the base is placed on a surface for cutting. The base hinged snap-lock may be operable to pivot about a mounting point on the base and may have an extended tab that provides a ridge for a user's finger when disengaging the snap-lock from the container lid snap-lock receiver. The lid hinged snap-lock may be operable to pivot about a mounting point on the lid and may have a low-profile tab for disengaging from the hinged snap-lock from the longitudinal side lock receiver. The bearing surface may have a plurality of ridges that provide a static obstruction operable to deform the peripheral gasket when compressed between the base and lid. The recessed channel may extend around the top surface and may be operable to collect excess liquids from cutting. The lid hinged snap-lock and the base hinged snap-lock may be connected to the lid and base with a living hinge connection. The cutting board top surface may be a flat planar surface that is elevated above the outer bearing surface and the recessed channel. The cutting board base may further comprise handles that extend out perpendicularly from the lateral sides of the base and may be operable to provide a lifting surface when transporting the system. The separate combination cutting boards and sealable container system may be scaled to a smaller dimension such that the base of the separate combination cutting board and sealable container system may nest into the lid forming a stack of cutting board systems. The peripheral bottom lip may have a substantially L-shaped geometry.

Further aspects and embodiments will be apparent to those having skill in the art from the description and disclosure provided herein.

It is an object of the present invention to provide a combination cutting board and sealable container system that does not require a user to flip over the cutting board when using the system for storage or transport.

It is a further object of the present invention to provide a cutting board that is suitable for preparing food and preventing spillage of liquids from food preparation, while also acting as a base of a container for storing food that has been prepared thereon.

It is a further object of the present invention to provide a lid that is operable to be secured around the prepared contents of a cutting board that does not disrupt the presentation of prepared contents.

It is another object of the present invention to provide a solution for reducing the number of cutting boards and food storage containers needed in a household.

It is a further object of the present invention to provide a water-tight seal between a cutting board base and a lid having a perimeter to prevent contamination of prepared food.

It is a further object of the present invention to provide a combination cutting board and sealable container system in which the lid may also be used as a bowl, which may be covered and closed with a water-tight seal.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

BRIEF DESCRIPTION OF THE DRAWINGS

FIG. 2 provides a top view of a combination cutting board and sealable container in a locked configuration, according to an embodiment of the present invention.

FIG. 2A provides a cross-sectional side view along line A-A of FIG. 2.

FIG. 2B provides a cross-sectional side view along line B-B of FIG. 2.

FIG. 5 provides a top view of a combination cutting board and sealable container in an unlocked configuration, according to an embodiment of the present invention.

FIG. 5A provides a cross-sectional side view along line A-A of FIG. 5.

FIG. 5B provides a cross-sectional side view along line B-B of FIG. 5.

FIG. 8 provides a close-up cross-sectional view of an exploded combination cutting board and sealable container of FIG. 7A about the dotted lines labeled SECTION 8.

FIG. 9 provides a close-up cross-sectional view of an assembled and locked combination cutting board and sealable container of FIG. 7B about the dotted lines labeled SECTION 9.

FIG. 11 provides a side view of a stack of different sized containers of embodiments of the present invention, each container having clamps of the same size.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention, which is not limited to the illustrated embodiments. However, it will be apparent to one skilled in the art that the present invention may be practiced without all of the specific details provided.

Figure 1:
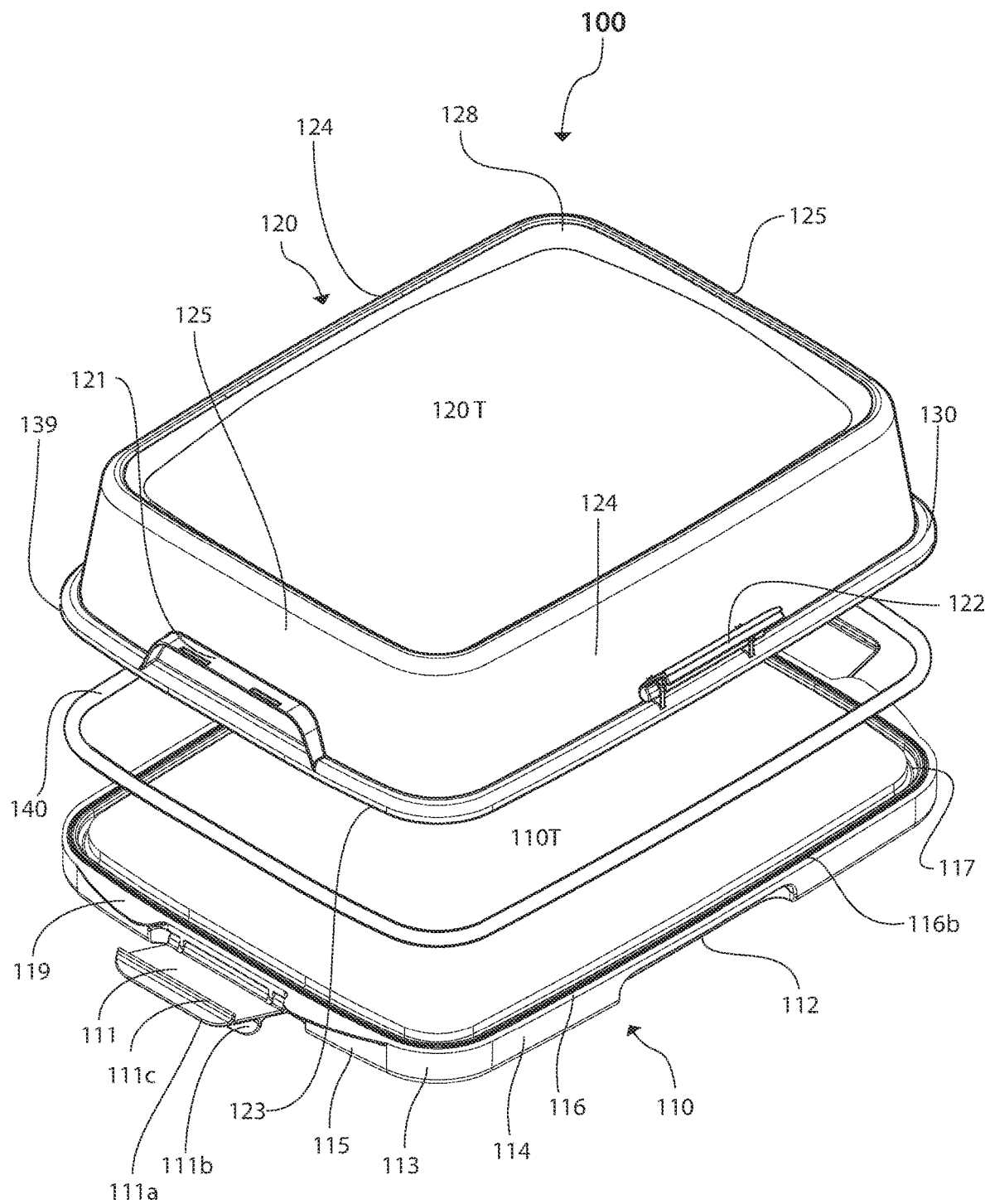
FIG. 1 provides an exploded perspective view of a combination cutting board and sealable container, according to an embodiment of the present invention.
Figure 3A:
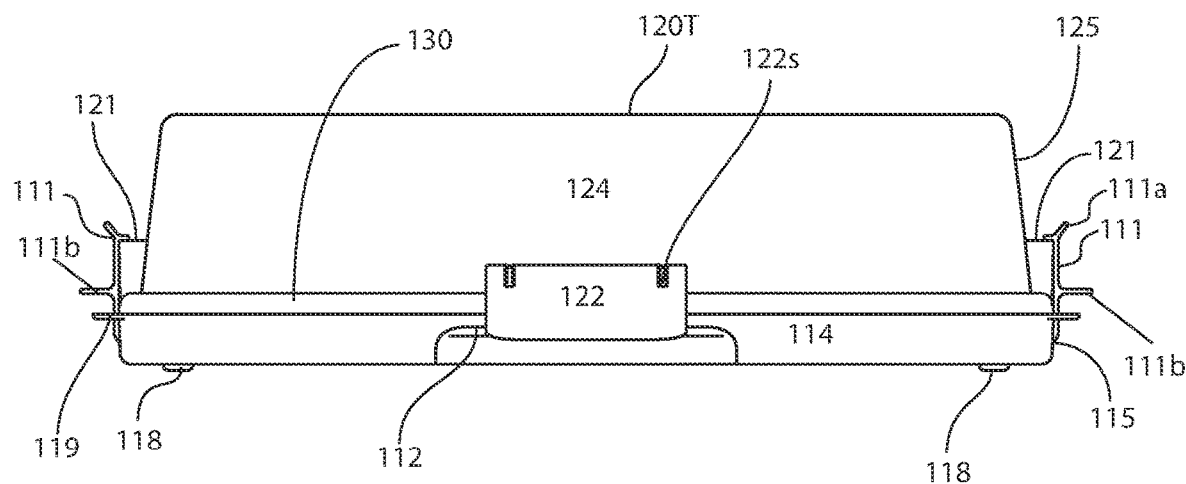
FIG. 3A provides a front view of a combination cutting board and sealable container in a locked configuration, according to an embodiment of the present invention.
Figure 3B:
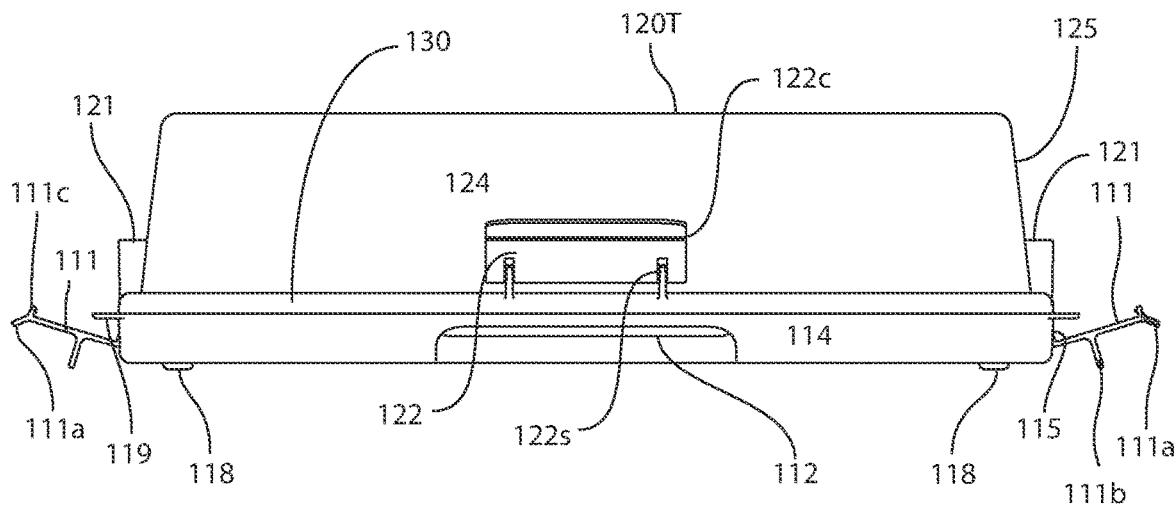
FIG. 3B provides a front view of a combination cutting board and sealable container in an unlocked configuration, according to an embodiment of the present invention.
Figure 4A:
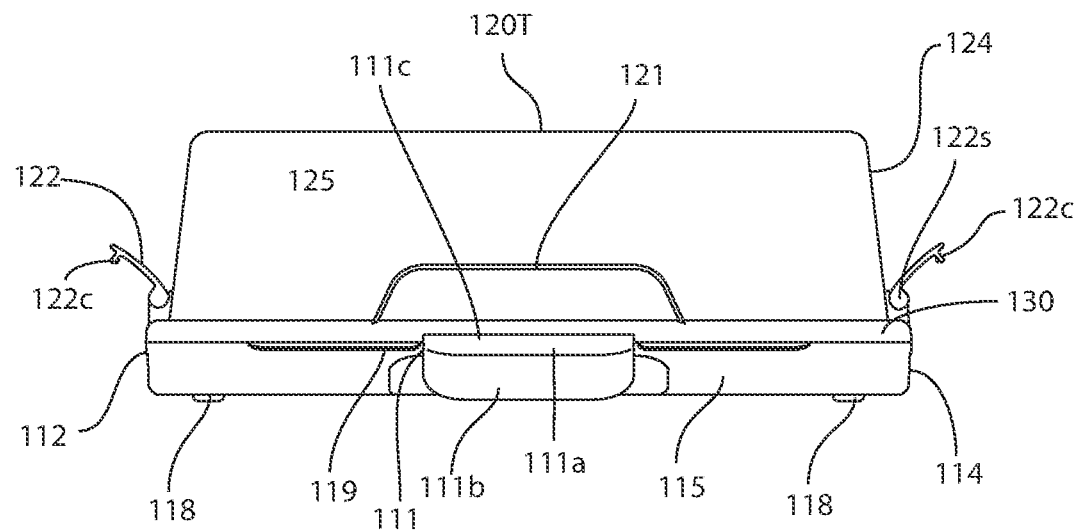
FIG. 4A provides a side view of a combination cutting board and sealable container in an unlocked configuration, according to an embodiment of the present invention.
Figure 4B:
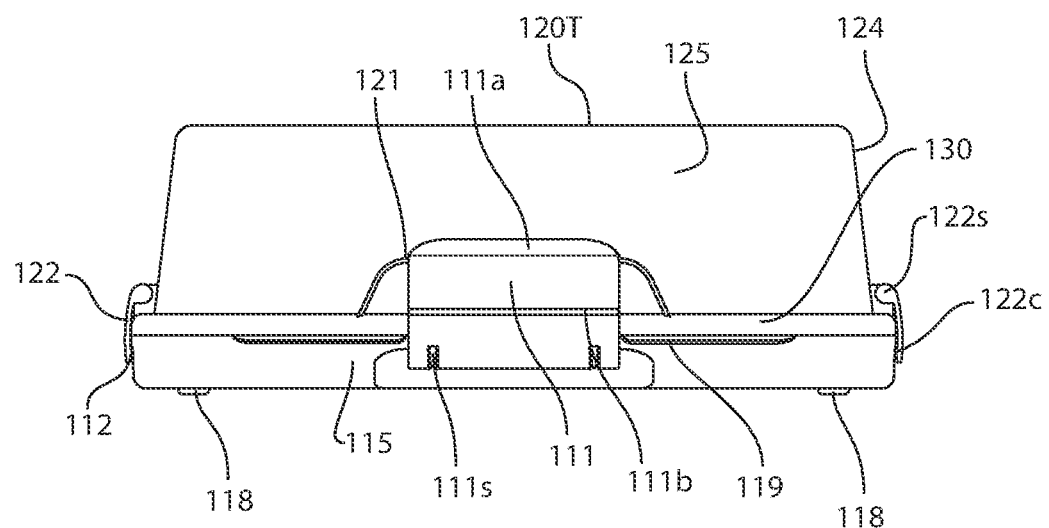
FIG. 4B provides a side view of a combination cutting board and sealable container in a locked configuration, according to an embodiment of the present invention.
Figure 6:
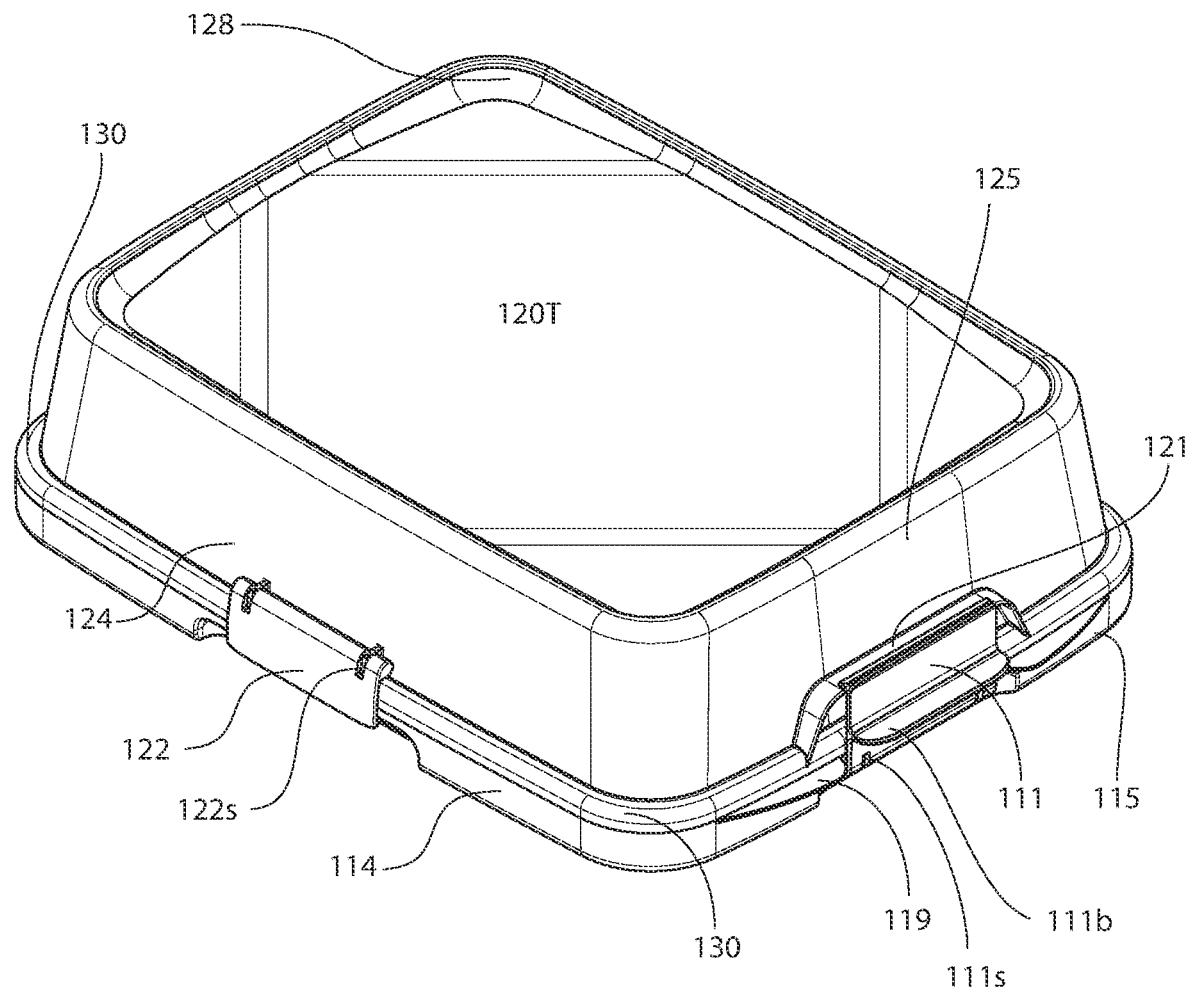
FIG. 6 provides a perspective view of a combination cutting board and sealable container in a locked configuration, according to an embodiment of the present invention.
Figure 7A:
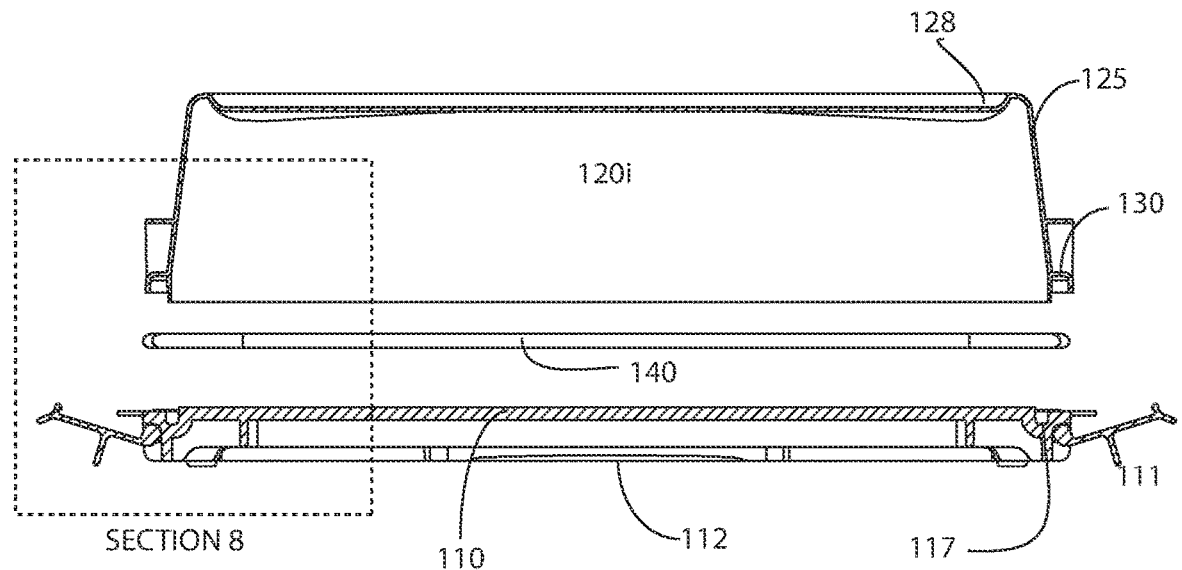
FIG. 7A provides an exploded cross-sectional front view of a combination cutting board and sealable container, according to an embodiment of the present invention.
Figure 7B:
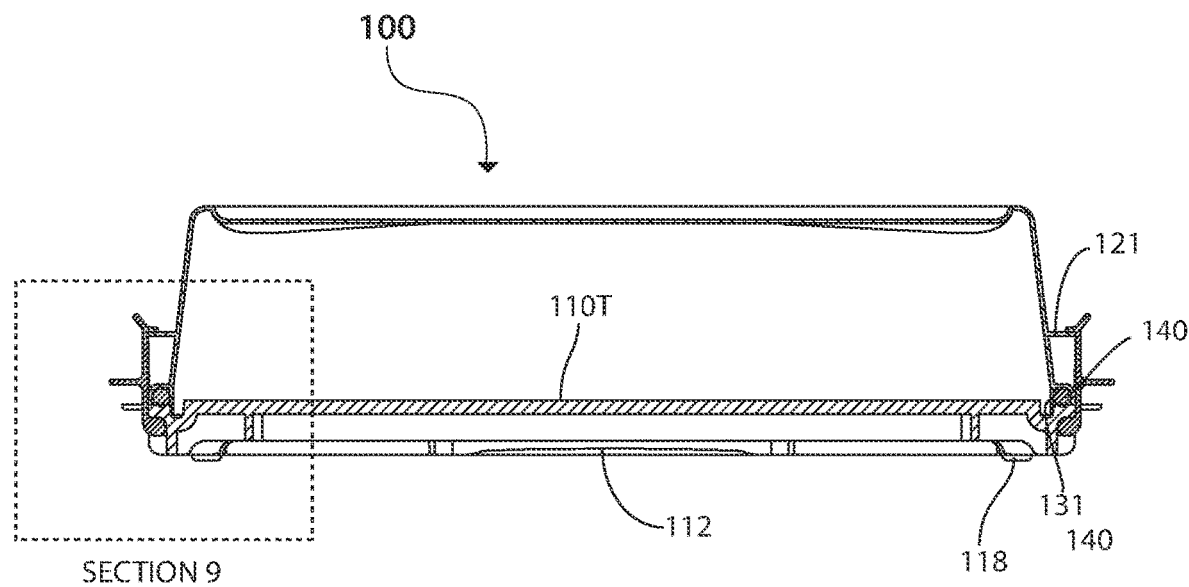
FIG. 7B provides a cross-sectional front view of a combination cutting board and sealable container in a locked configuration, according to an embodiment of the present invention.

Referring to the drawings wherein like reference characters designate like or corresponding parts throughout the several views, and referring initially to FIG. 1, it is seen that the illustrated exemplary combination 100 of the present invention includes a base 110 and a lid 120, each being symmetrical longitudinally and laterally about the central axes, shown in lines B-B and A-A of FIGS. 2 and 5. The illustrated exemplary base 110 may have front and back sides 114 sometimes referred to herein as a "base longitudinal side", and right and left sides or ends 115 sometimes referred to herein as a "base lateral side". Similarly, the illustrated exemplary lid 120 may have front and back sides 124 sometimes referred to herein as a "lid longitudinal side", and right and left sides 125 sometimes referred to herein as a "lid lateral side". In embodiments of the invention, base 110 and lid 120 couple together and provide a water-tight seal along the mating surface for containing food, liquids and preventing the contents from contamination from an external environment.

Figure 10A:
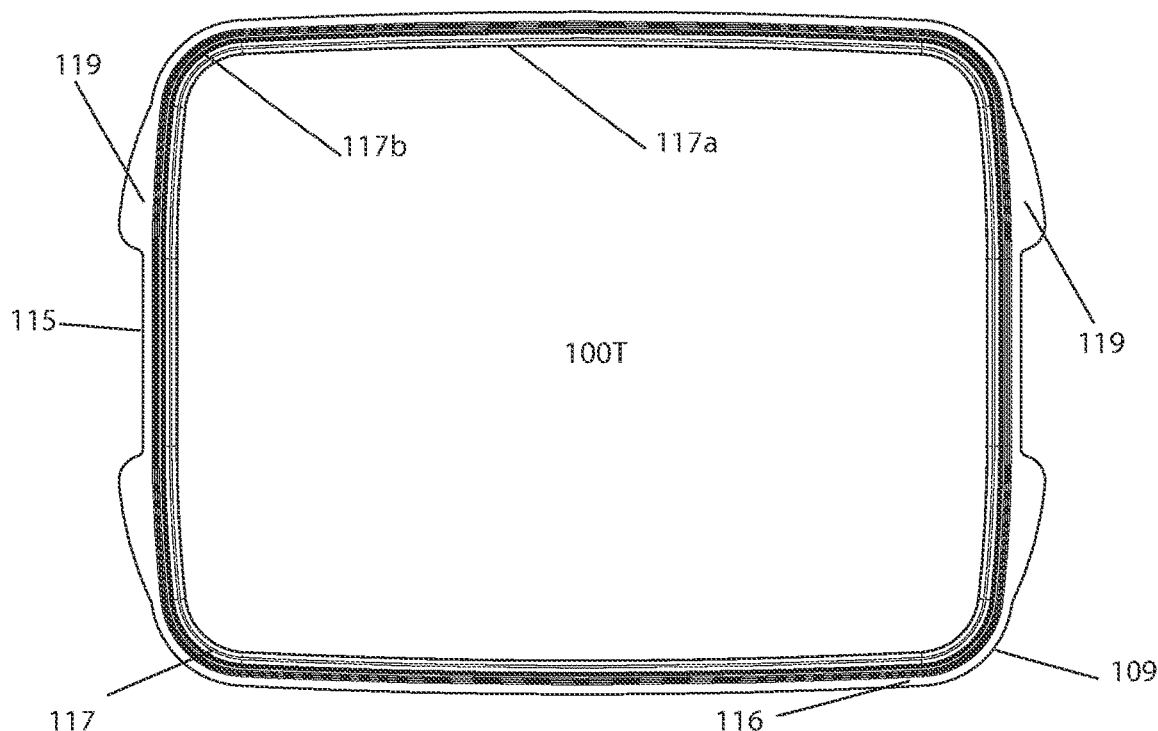
FIG. 10A provides a top view of a cutting board base of the combination cutting board and sealable container, according to an embodiment of the present invention.

The illustrated exemplary base 110 may include a base top surface 110T, a base bottom surface 110b, and an exterior perimeter 109, a top-down view of the base is illustrated in FIG. 10A. The top surface 110T may be a cutting board, which may be integrated into the base or attached thereto. In some embodiments top surface 110T is raised above the exterior bearing surface 116. On the base bottom surface 110b, there may be a plurality of feet 118 operable to provide friction when the base 110 is placed on a surface (e.g., countertop) to prevent the base from sliding during food preparation or cutting. In some embodiments, the base 110 may include a pair of handles 119 on the each of the base lateral sides 115 that protrude outward from the exterior perimeter 109 of the base. In some embodiments a hinged snap-lock 111 may be positioned between the pair of handles. In some embodiments, on the base longitudinal side 114, a snap-lock receiver 112 may be positioned midplane of the base 110. In some embodiments, a recessed fluid channel 117 may be positioned between the cutting surface 110T and an outer bearing surface 116. The fluid channel 117 channel may have an outer edge 117b and an inner edge 117a. In some embodiments, a bearing surface 116 is positioned between the fluid channel outer edge 117b and the exterior perimeter 109 of the base 110.

Figure 10B:
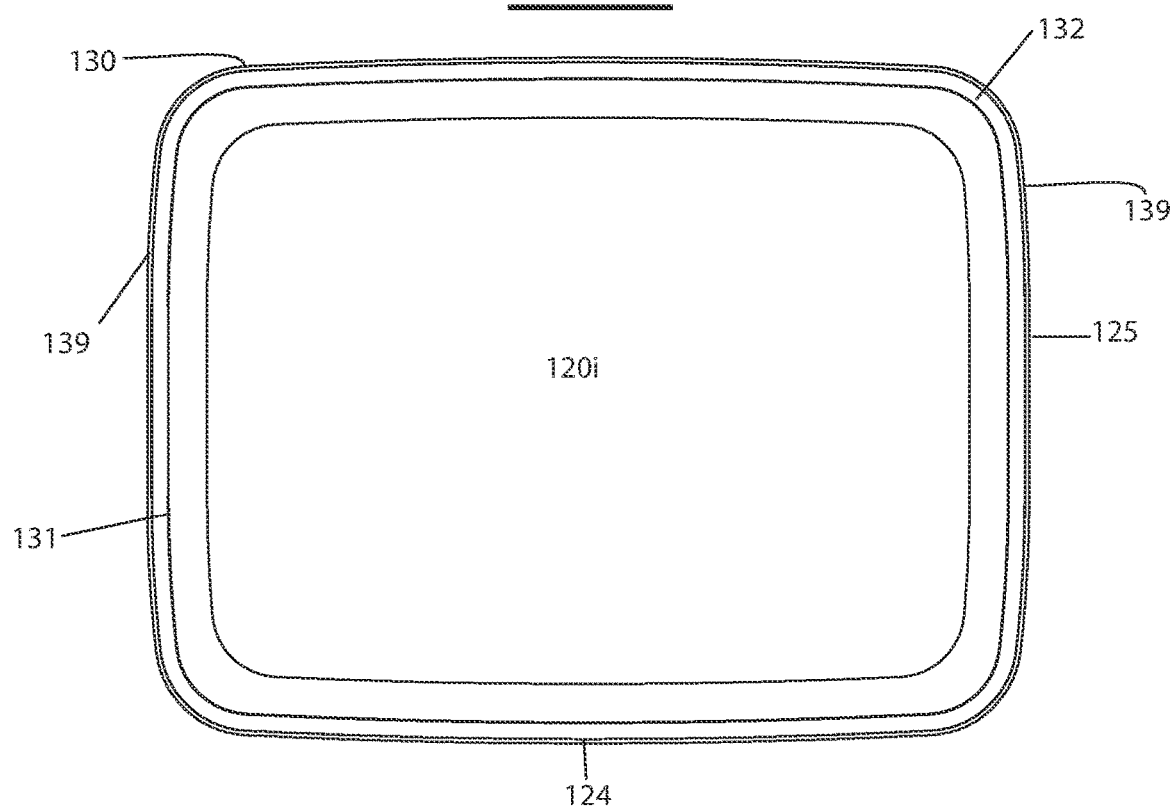
FIG. 10B provides a bottom view of a sealable lid of the combination cutting board and sealable container, according to an embodiment of the present invention.

Embodiments of the lid 120 may include a top surface 120T, an interior cavity 120i, lateral latches such as a snap-lock receiver 121 positioned midplane on each of the lateral sides 125, longitudinal latches such as a snap-lock 122 positioned midplane on each of the longitudinal sides 124. It is to be appreciated that in other embodiments, different kinds of latches may be used instead of the illustrated snap-lock and receivers. Embodiments of the lid may also include a top surface 120T having a recess 128 operable to receive the underside of a base 110 of a separate combination cutting board and sealable lid 100. A bottom-up view of such a lid 120 is illustrated in FIG. 10B. Embodiments of the lid 120 may further include a bottom lip 130 along the peripheral of the bottom edge operable to confine and compress a gasket 140 when the lid 120 and base 110 are secured together. The exploded view of FIG. 1, illustrates the arrangement of the base 110, gasket 140, and sealable lid 120.

The illustrated exemplary combination cutting board and sealable container 100 may be configurable between a locked position, illustrated in FIGS. 2-3, 4B, 6, 7B, and 9, and an unlocked position, illustrated in FIGS. 3A, 4A, 5-5B, 7A, and 8. To configure the illustrated exemplary combination cutting board and sealable container into the locked position, on the lateral side 115, 125 the base snap-lock hinge 111 is rotated upward around its pivot 111s on base 115 such that ridge 111c engages with the receiver 121 on lid 115. Compare the open position illustrated in FIG. 8 with the closed position illustrated in FIG. 9. In the illustrated embodiments, hinge 111 includes an optional angled extension or tab 111a extending from a corner of hinge 111 which may be utilized to disengage the hinge from its locked position when it is desired to open the container. In the illustrated embodiments, hinge 111 also includes an optional outward extension or tab 111b which may be used as a handle to lift the container once it is sealed.

Similarly, on the longitudinal side, 114, 124 the lid snap-lock 122 rotates about a pivot 122s and engages a snap-lock ridge 122c with the base snap-lock receiver 112. In some embodiments, the lateral side may have the snap-lock positioned on the lid, and the receiver on the base 110 and inversely is the same for the longitudinal side having a snap-lock positioned on the base and engaging with a receiver on the lid 120. As noted previously, in other embodiments, different latching devices may be used instead of those illustrated in these figures.

FIG. 8 provides a close-up cross-sectional view (SECTION 8 of FIG. 7A) of an exemplary bottom lip assembly 130 showing the bottom this assembly positioned along the periphery of the bottom edge. The exemplary lip assembly 130 may include a curved outer peripheral edge 139 and an internal flange 131 defining a gap 132 spanning between the peripheral edge 139 and said flange 131. The gap 132 may be operable to secure a gasket 140. Internal flange 131 extends distally from the sidewall of the lid 120 and may be operable to align the lid 120 with the base 110, as shown in FIG. 9. The exemplary base 110 may have a perimeter edge 109 and a bearing surface 116 with ridges 116b immediately adjacent to the fluid channel outer edge 117b. The exemplary fluid channel 117 may include a fluid channel outer edge 117b, and a fluid channel inner edge 117a may be shared with the peripheral edge of the cutting surface 110T. When assembled, flange 131 may be aligned inside the fluid channel 117 and immediately adjacent to the outer edge of the fluid channel 117b. A bottom view of an exemplary lid 120 is illustrated in FIG. 10B which shows the interior food cavity 120i, and the exterior lip 130 provided along the perimeter of the lid 120. Gap 132 is provided between the inner flange 131 and edge 139 of the lid for receiving gasket 140. A top-down view of the base 110 illustrates the peripheral edge of the cutting board and fluid channel edge 117a, the base perimeter 109, the bearing surface 116 with ridges 116b, and a pair of handles 119 that may be provided on one or both of the lateral sides 115.

FIG. 9 shows a close-up cross-sectional view of an exemplary combination cutting board and container 100 in a locked configuration. On the lateral sides 125, 115 when the lid 120 is positioned over the base 110, the lateral locking hinged snap-lock 111 may rotate around a mounting point on the base, and may engage with a groove on the snap-lock receiver 121 of the lid 120, thereby compressing and deforming the gasket 140 to form a water-tight seal between the lid 120 and the base 110. The flange 131 aligns adjacent to the outer fluid channel edge 117a and the lips perimeter edge 139 aligns with the base perimeter edge 109. On the lateral side 115, 125, the male locking mechanism 111 is rotatably and pivotally attached with a hinge to the base 110. However, on the longitudinal side 114, 124 the male locking mechanism 122 is attached to the lid, and engages a snap-lock receiver 112 on the base 110, as described more fully below with reference to FIGS. 12A-14. The same principles apply to gasket 140 on the longitudinal as described for the lateral side. When the cutting board container 100 is in the locked configuration, the gasket 140 is deformed to provide a water-tight seal. It is to be appreciated that in other embodiments, the orientations of one or more of the snap-lock clamping members may be reversed, such that the pivotally attached hinge 111 and related assembly is attached to the lid instead of the base, and the receiver 112 and related assembly is provided on the base instead of the lid.

It has been determined that improved engagement and sealing is accomplished where clamps having the same orientation are located on opposite sides from each other, and where opposing pairs of clamps have a different orientation. Thus, improved engagement and sealing may be accomplished as shown in the illustrated embodiment, where the pivotal hinge members of the two oppositely positioned clamps on the front and back of the container 122 are both attached to the front and back 124 of lid 120 (with both receivers 112 on the front and back 114 of the base 110), and the pivotal hinge members of the two oppositely positioned clamps on the two sides of the container 111 are both attached to the base 110 (with both receivers 121 on the sides 124 of the lid 120). In other embodiments, improved engagement and sealing may be accomplished, for example, where the pivotal hinge members of the two oppositely positioned clamps on the sides of the container are both attached to the lid (with both side receivers on the base), and the pivotal hinge members of the two oppositely positioned clamps on the front and back of the container are both attached to the base (with both receivers on the front and back of the lid). In different embodiments, each of the different snap-lock clamping members may have its own independent orientation.

Figure 11:
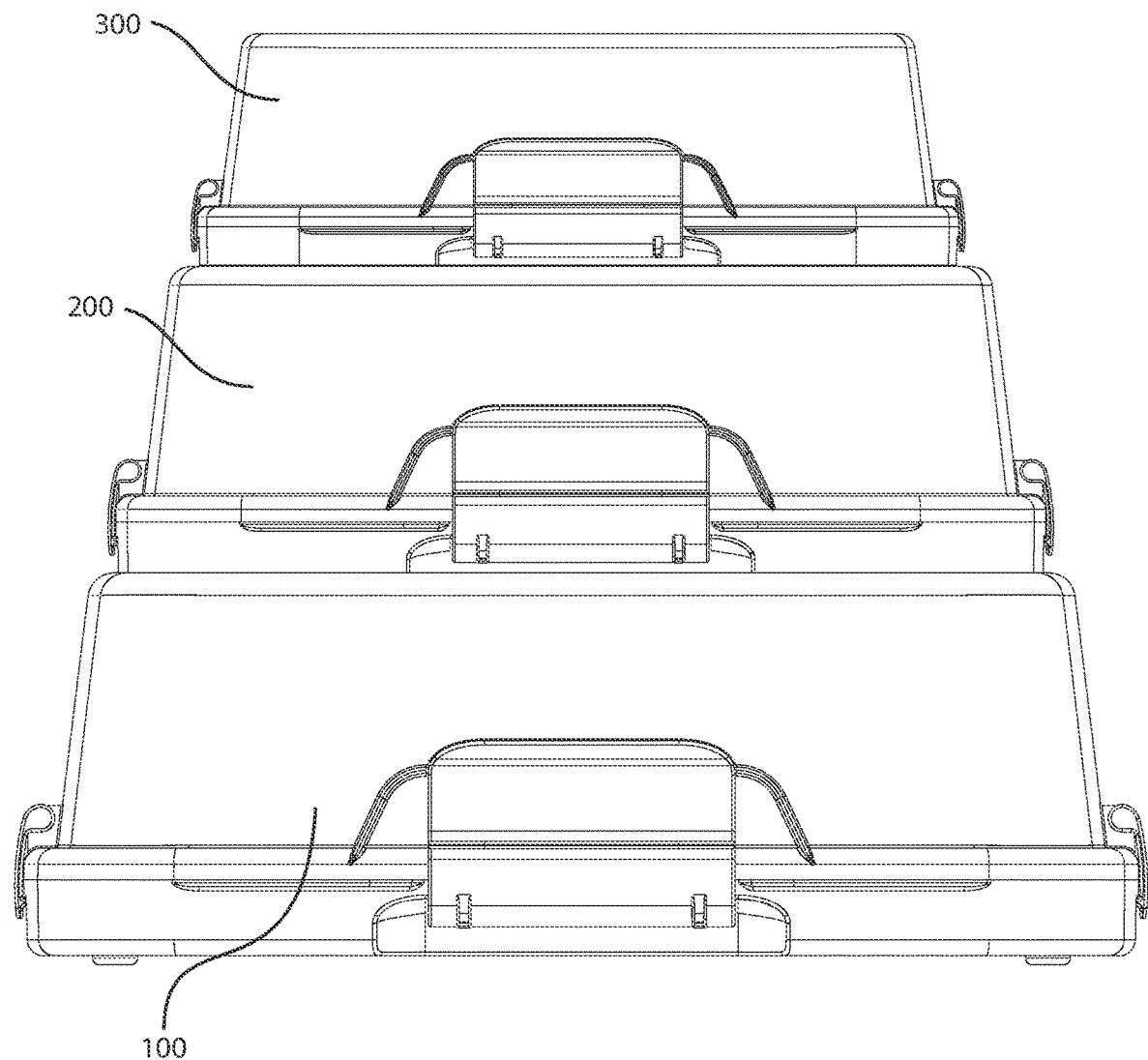
FIG. 11 provides a side view of a stack of containers of embodiments of the present invention, each container having a different size.
Figure 12A:
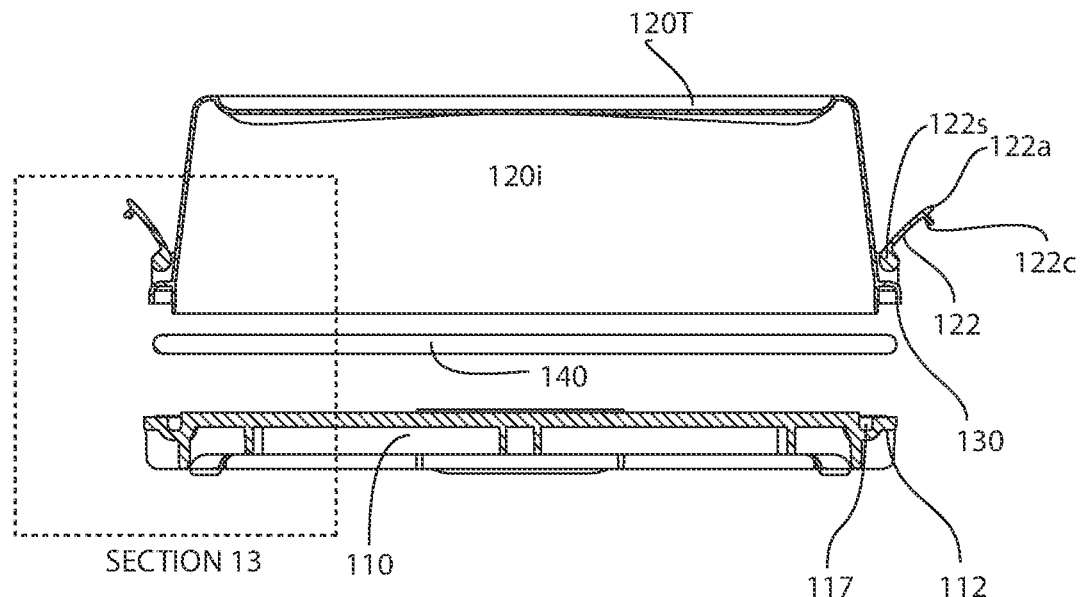
FIG. 12A provides an exploded cross-sectional side view of a combination cutting board and sealable container, according to an embodiment of the present invention.
Figure 12B:
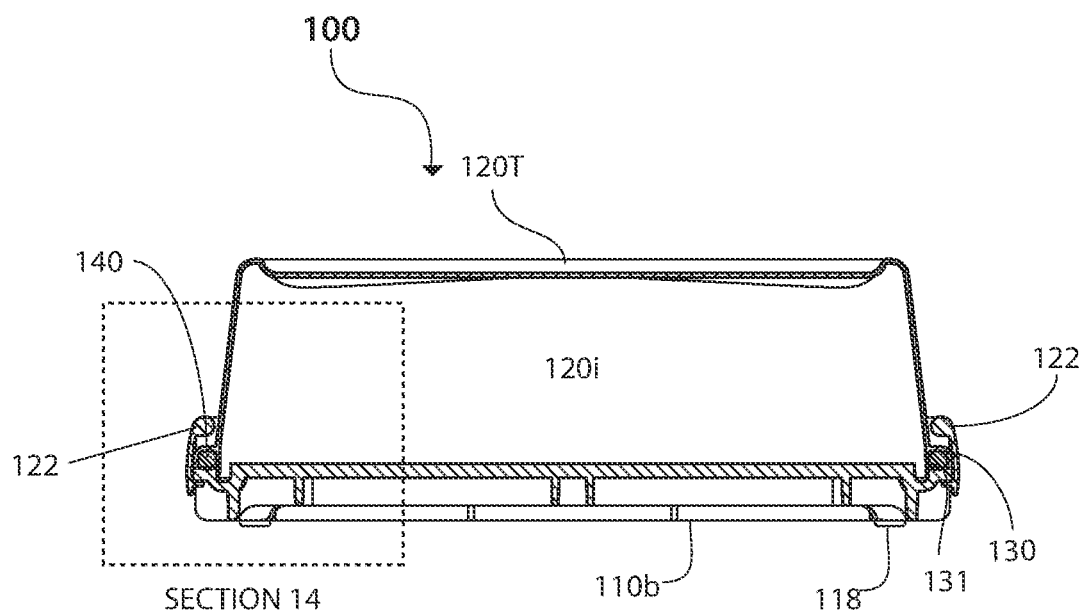
FIG. 12B provides a cross-sectional side view of a combination cutting board and sealable container in a locked configuration, according to an embodiment of the present invention.
Figure 13:
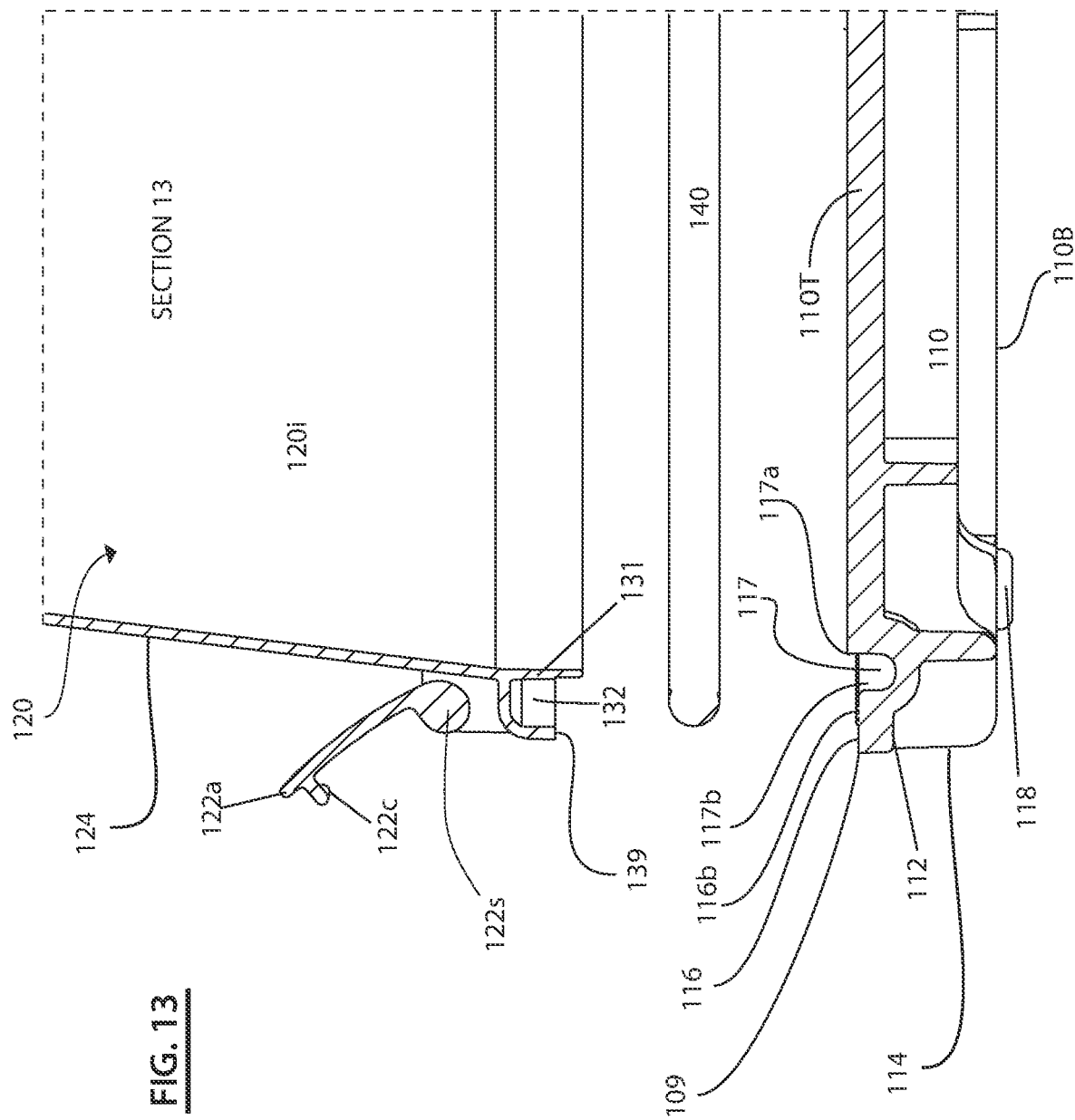
FIG. 13 provides a close-up cross-sectional view of an exploded combination cutting board and sealable container of FIG. 12A about the dotted lines labeled SECTION 13.
Figure 14:
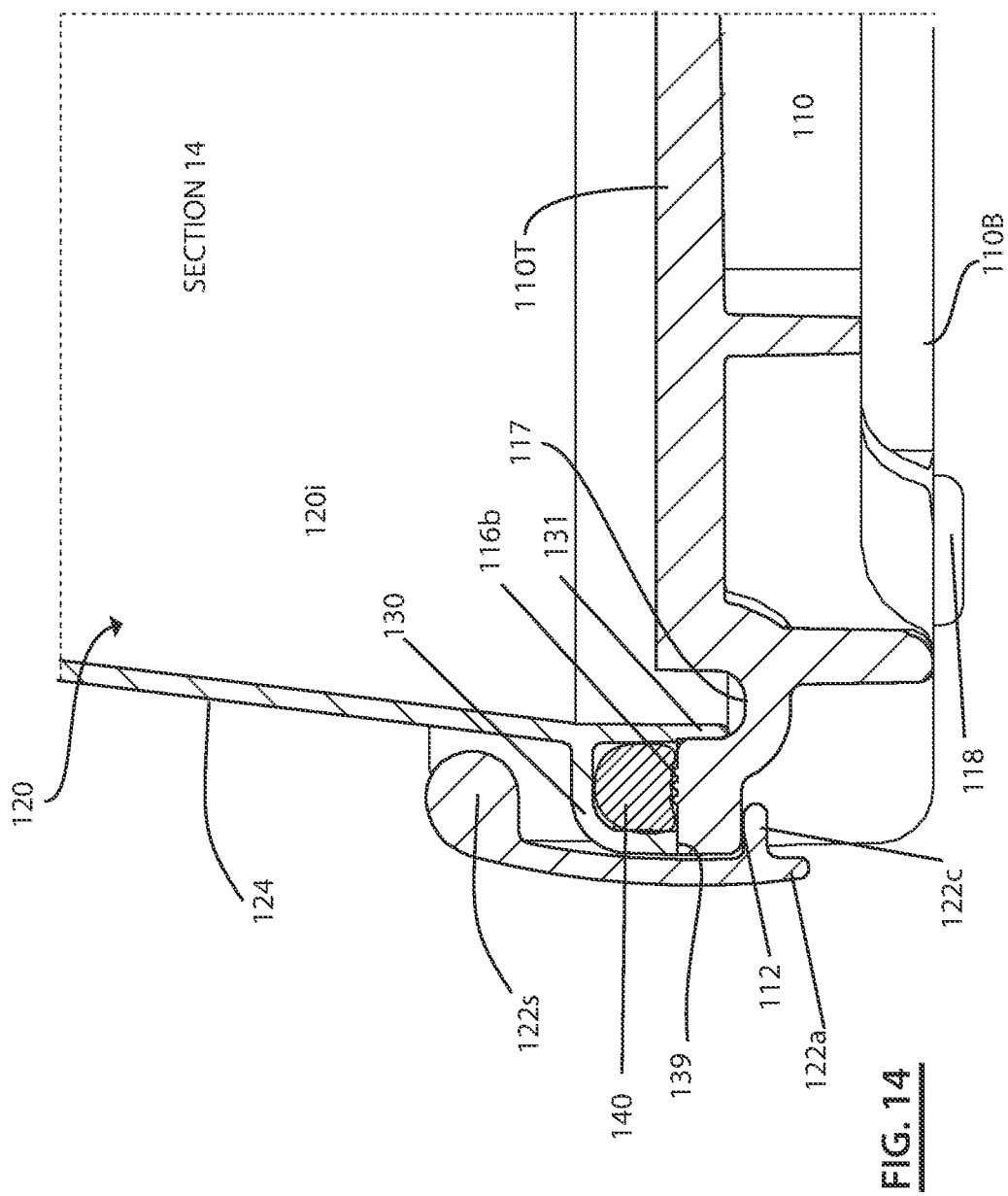
FIG. 14 provides a close-up cross-sectional view of an assembled and locked combination cutting board and sealable container of FIG. 12B about the dotted lines labeled SECTION 14.
Figure 15:
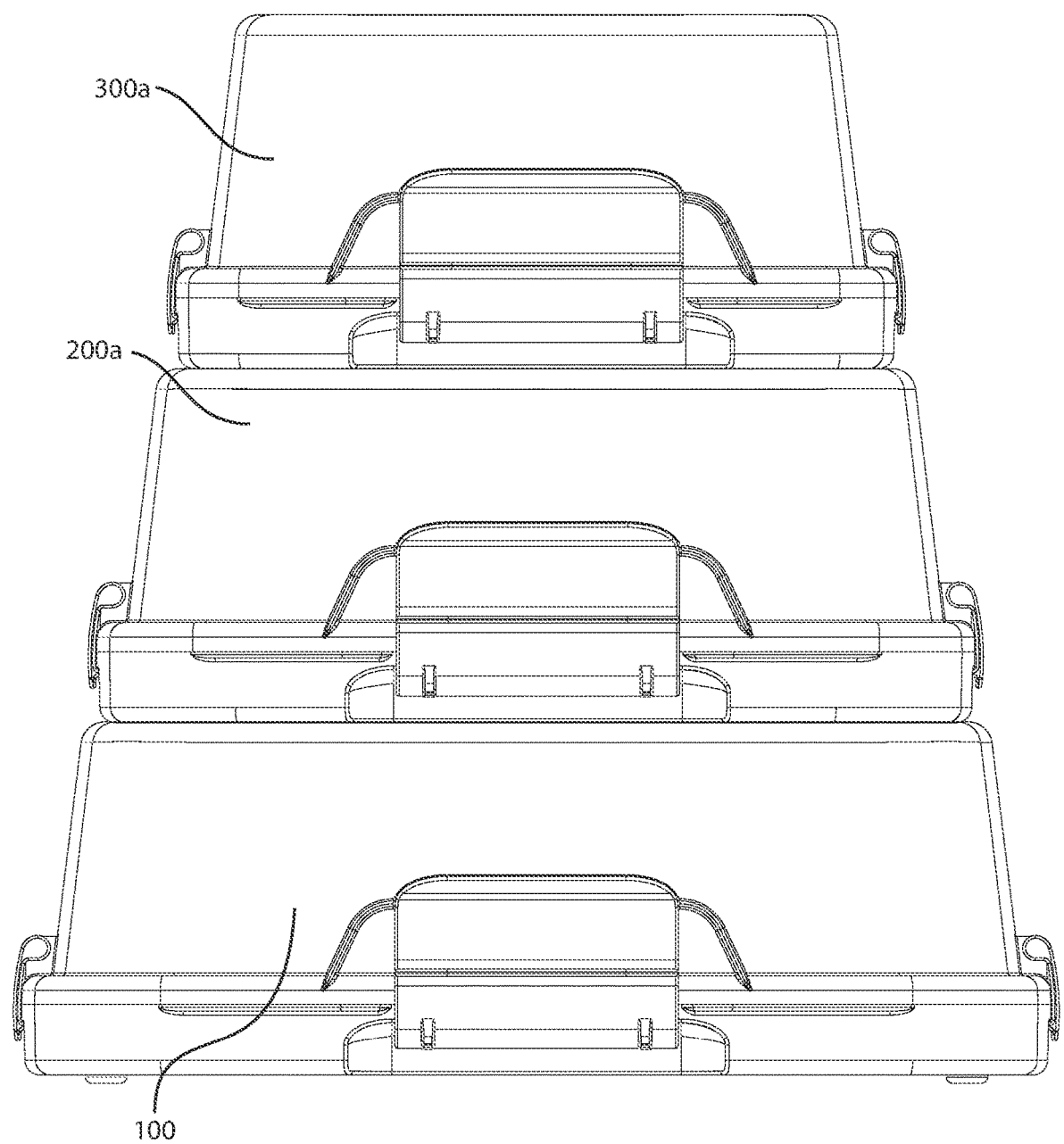

FIG. 11 shows a nesting stack of a plurality of differently sized combination cutting board and sealable containers. A first container 100 provides a recess on the top surface and is sized to receive the base of a second container 200. Similarly, a third container 300 is positioned on the top surface of second container 200 and sized to nest into the recess of container 200. In this illustration, each of the combination cutting boards and sealable containers has a different size, but still includes all the aforementioned components included in the description of container 100, and each of the components are scaled to a size proportional to their respective lid and base. In the illustration of FIG. 11, stacking the smaller and smaller systems forms a type of pyramid. It is to be appreciated that when not in use, the smaller systems may be placed inside the larger ones in a nesting configuration to conserve space for storage. In alternative embodiments a plurality of containers of the same size may be stacked upon each other, which will form tall structure with parallel sides, not a pyramid. FIG. 15 shows a similar stack of differently sized containers of embodiments of the present invention where the clamps are all of the same size.

FIGS. 12A-14 provide a close-up cross-sectional view (SECTION 13 and SECTION 14) of an exemplary longitudinal side clamp assembly 122. On the longitudinal sides, 114, 124 the hinged snap-lock 122 is attached to the lid 120, and rotates about a pivot 122s that allows a snap-lock ridge 122c to engage with the base snap-lock receiver 112 (See FIG. 14). Extended tab 122a allows the user to access a locked snap-lock 112 for easy disengagement.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. A sealable container comprising:
   a. a generally rectangular base having a raised upper cutting surface, a peripheral edge, two generally parallel longitudinal sides, two generally parallel lateral sides perpendicular to said longitudinal sides, a peripheral fluid channel on said raised upper cutting surface adjacent to said peripheral edge, and a lower peripheral bearing surface provided between said peripheral fluid channel and said peripheral edge;
   b. a generally rectangular lid comprising an interior cavity and peripheral edge having an internal peripheral flange thereon that is complementary to said peripheral fluid channel such that said internal peripheral flange is operable to be inserted into said peripheral fluid channel, and an outer peripheral lip defining a gap between said internal peripheral flange and said outer peripheral lip;
   c. a deformable gasket provided in said gap of said lid for providing a seal between said gasket and said lower peripheral bearing surface when said lid is engaged with said base;
   d. a first pair of clamps oppositely positioned from each other on each of said longitudinal sides of said container; and
   e. a second pair of clamps oppositely positioned from each other on each of said lateral sides of said container;
   wherein each of said first pair of clamps includes a first locking member that is pivotally attached to a first one of said lid and said base, and a corresponding first receiver fixedly attached to the other one of said lid and said base, and
   wherein each of said second pair of clamps includes a second locking member that is pivotally attached to the other one of said lid and said base, and a corresponding second receiver fixedly attached to the first one of said lid and said base, and wherein each of said first and second locking members further comprises a ridge for frictional engagement against its corresponding receiver, a first tab that extends horizontally outward when said locking member is engaged with its corresponding receiver, and a second tab on a corner of said locking member that extends at an upward angle of about 45° when said locking member is engaged with its corresponding receiver.

2. The container of claim 1 wherein the first locking member of each of said first pair of clamps is pivotally attached to said lid and the corresponding first receivers are attached to said base, and wherein the second locking member of each of said second pair of clamps is pivotally attached to said base and the corresponding second receivers are attached to said lid.

3. The container of claim 1 wherein the first locking member of each of said first pair of clamps is pivotally attached to said base and the corresponding first receivers are attached to said lid, and wherein the second locking member of each of said second pair of clamps is pivotally attached to said lid and the corresponding second receivers are attached to said base.

4. The container of claim 1 further comprising a plurality of ridges provided on said bearing surface where said bearing surface meets said gasket when said lid is engaged with said base.

5. The container of claim 1 wherein said lid further comprises two generally parallel longitudinal sides, two generally parallel lateral sides perpendicular to said longitudinal sides, and an upper surface that includes a recess having a shape that is complementary to a bottom surface of said base, or a bottom surface of a base of another of sealable container.

6. The container of claim 1 wherein at least one handle is provided on said peripheral edge of said base.

7. The container of claim 1 further comprising at least one recess in an underside of said base having a shape corresponding to a kitchen implement.

8. A combination cutting board and sealable container system, the system comprising:
    a. a base having a cutting board on a top surface thereof, a bottom surface having a plurality of tactile feet, two lateral sides, each such side having a snap-lock clamp thereon, and two longitudinal sides, each longitudinal side having a snap-lock receiver thereon;
    b. a recessed channel provided on said top surface along a perimeter thereof, an outer bearing surface provided on said top surface between perimeter of said base, and a said recessed channel and provided between a peripheral edge of said top surface; and
    c. a container lid comprising a top surface, an interior cavity, an exterior surface, two lateral sides each having a snap-lock receiver thereon, two longitudinal sides each having a snap-lock clamp thereon, a peripheral bottom lip having a peripheral gap therein, and a peripheral gasket in said gap corresponding to said outer bearing surface, wherein each of the clamps on the two lateral sides of the base further comprises: a ridge for frictional engagement against its corresponding receiver on the lid, a first tab that extends horizontally outward when said clamp is engaged with its corresponding receiver on the lid, and a second tab on a corner of the clamp that extends at an upward angle of about 45° when the clamp is engaged with its corresponding receiver on the lid.

9. The system of claim 8, wherein said top surface of said container lid includes a recess operable to receive said bottom surface of said base, or to receive a bottom surface of a base of a separate combination cutting board and sealable container system.

10. The system of claim 8, wherein the bearing surface of said base is operable to contact the peripheral lip of said container lid, and wherein the lateral snap-locks on said base are operable to engage with the snap-lock receivers on the lateral surfaces of said lid, and wherein the snap-locks on the longitudinal surfaces of said lid are operable to engage with the receivers on the longitudinal surfaces of said base, thereby compressing said gasket against said bearing surface to form a water-tight seal along the periphery of said base.

11. The system of claim 10, wherein said lid further comprising a flange offset from said peripheral bottom lip such that the flange protrudes out from said lid exterior surface and extends into said recessed channel against a junction of said bearing surface and said recessed channel.

12. The system of claim 11, wherein said flange and peripheral bottom lip comprise said gap which is operable to secure said peripheral gasket therein.

13. The system of claim 8, wherein said perimeter of said base is substantially rectangular, and said peripheral bottom lip of said lid is complementary to the base perimeter.

14. The system of claim 13, wherein said plurality of tactile feet comprises at least four feet positioned at corners of said base bottom surface that are operable to provide friction to prevent said base from slipping when placed on a surface.

15. The system of claim 8, wherein said recessed channel extends around said top surface and is operable to collect excess liquids from cutting.

16. The system of claim 8, wherein each of said lid snap-lock hinges and said base snap-lock hinges are living hinges.

17. The system of claim 8, wherein said cutting board top surface is a flat planar surface that is elevated above said outer bearing surface and said recessed channel.

18. The system of claim 8, wherein said cutting board base further comprises handles extending out from the lateral sides of the base and are operable to provide a lifting surface when transporting said system.

* * * * *